INVENTOR
EDWARD SELTZER
FREDERICK SAPORITO
BY
Curtis, Morris & Safford.
ATTORNEYS

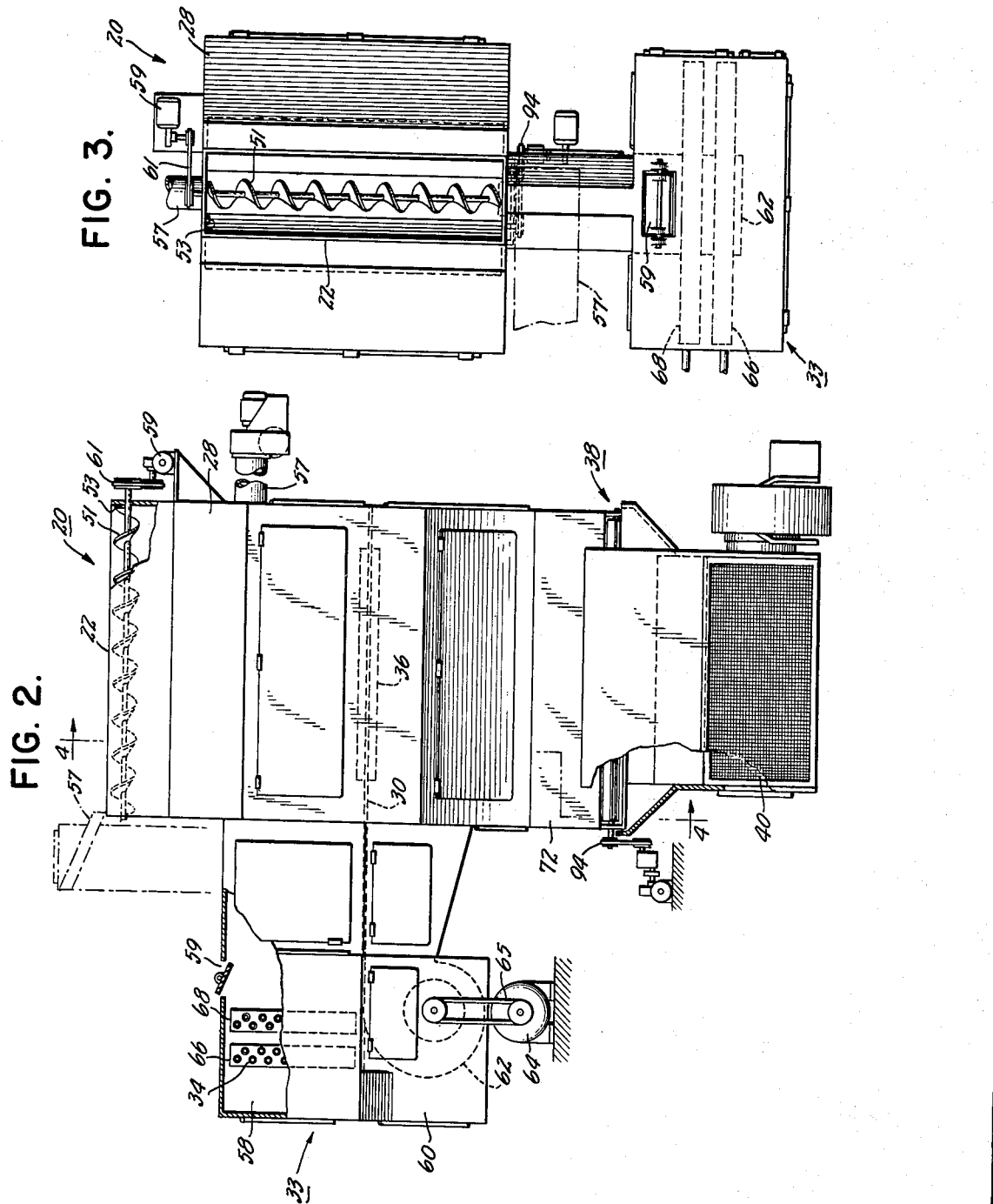

April 3, 1956  E. SELTZER ET AL  2,740,204
DRYER FOR GRANULAR MATERIAL
Filed Feb. 27, 1953  4 Sheets-Sheet 3
FIG. 4.
FIG. 5.
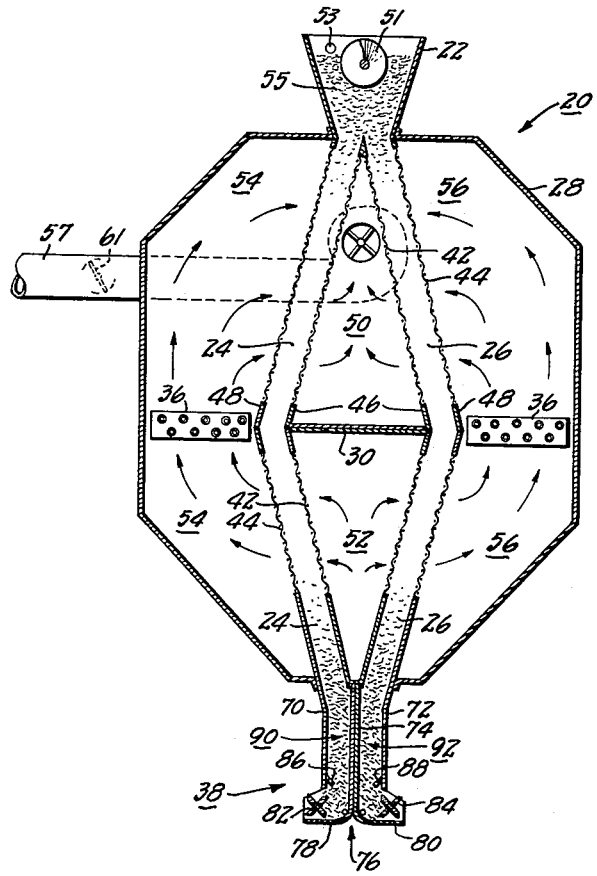
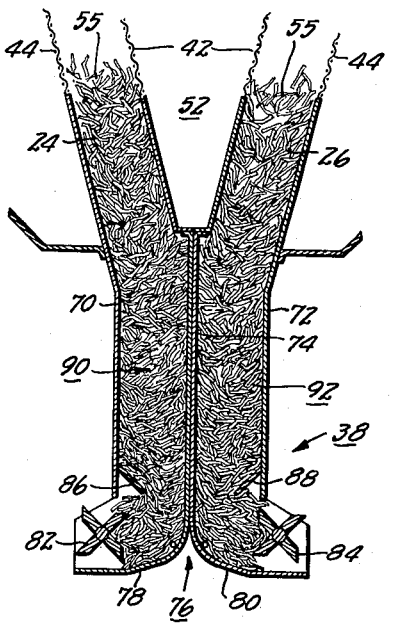
FIG. 7.
FIG. 6.
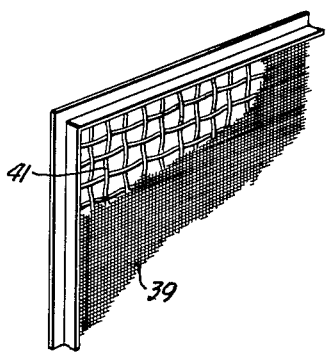
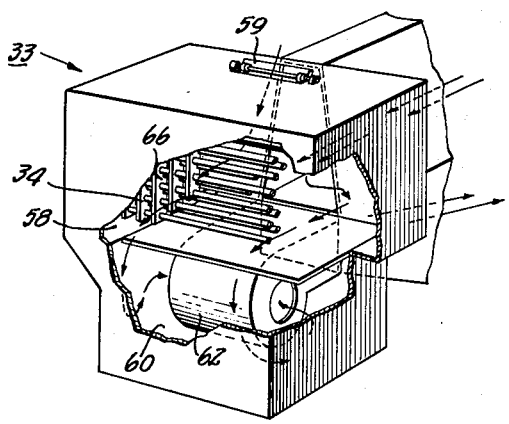
INVENTOR
EDWARD SELTZER
FREDERICK SAPORITO
BY
Curtis Morris & Safford.
ATTORNEYS April 3, 1956  E. SELTZER ET AL  2,740,204
DRYER FOR GRANULAR MATERIAL
Filed Feb. 27, 1953  4 Sheets-Sheet 4
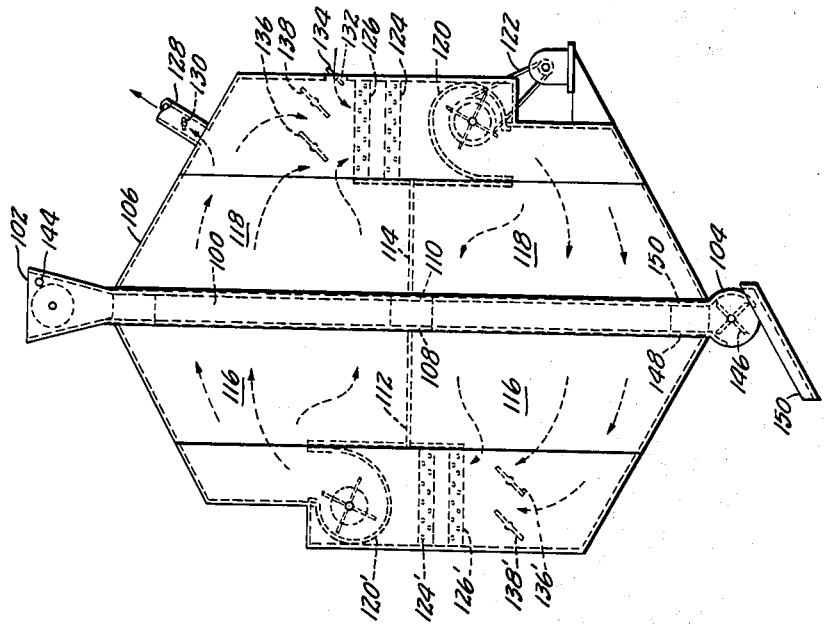
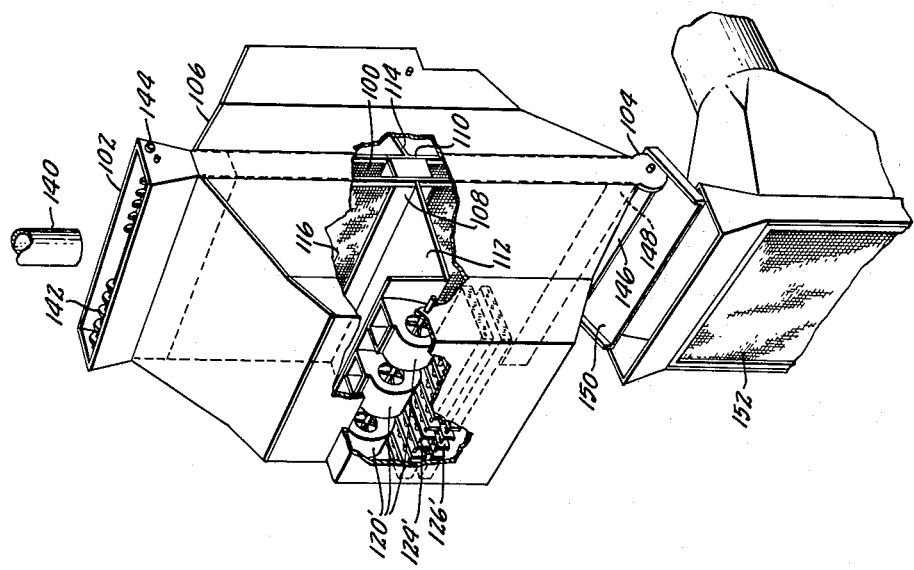
INVENTOR
EDWARD SELTZER
FREDERICK SAPORITO
BY
Curtis, Morris & Safford.
ATTORNEYS United States Patent Office 2,740,204
Patented Apr. 3, 1956

2,740,204

DRYER FOR GRANULAR MATERIAL

Edward Seltzer, Teaneck, N. J., and Frederick Saporito, Franklin Square, N. Y., assignors to Thomas J. Lipton Inc., Hoboken, N. J., a corporation of Delaware Application February 27, 1953, Serial No. 339,291

7 Claims. (Cl. 34—174)

This invention relates to a device for controlling the relative moisture content of solid particulate material, and more particularly to a columnar dryer for free flowing granular material such as noodles, rice, coffee beans and the like, of the type wherein the product to be dried is flowed with the aid of gravity in relatively narrow columns transversely to the flow of a circulated drying atmosphere.

In the handling of free flowing granular material such as grains, coffee beans, catalyst beads, and the like, it is often desired to control the moisture content thereof. This is particularly so in packaging dehydrated foods such as soups and the like, wherein there are a variety of components, as it has been found necessary to control carefully and accurately the relative moisture content of the components in order to prevent undesired flavor effects between the components. Various mechanisms including columnar dryers have been proposed for reducing the moisture content of such products, but such machines have had limited application to processed food stuffs, apparently because of the limited capacity, unsanitary handling of the product, and inaccurate control of the moisture content of the processed product. Columnar dryers particularly have in addition, had a laminar differential of moisture content progressing from the side of the column through which the drying atmosphere enters to the side where the drying atmosphere is discharged. For example, with machines of this type noodles introduced at a 9% moisture content would at discharge, have a moisture content varying from 5% to 7%, depending upon the layer position they occupied in relation to the drying atmosphere front. In addition, not only is the end product non-uniform in final moisture content, but a mechanism of moisture absorption is set up in the outer layers of the column such that the drying time is increased materially or the product is subject to overheating or scorching.

Applicants have discovered that by passing the heated drying atmosphere approximately normal to the flow of the material to be dried in one direction while the nearest layers are rapidly dried to or slightly beyond the desired moisture content and the remote layers are dried but little, if any, and then reversing the direction of flow of the drying atmosphere, the above mentioned difficulties and objections are overcome.

Accordingly it is an object of the present invention to provide a columnar dryer for drying free flowing granular material to a uniform moisture content regardless of position within the column. It is another object to provide a columnar dryer for products such as noodles and the like, of an improved construction having a greater capacity per unit of space occuped. It is another object of the present invention to provide such a columnar dryer which will control accurately the moisture content of the material being dried. It is another object of the present invention to provide product-handling facilities in a columnar dryer for noodles, and the like, of greatly improved sanitary characteristics. It is another object of the present invention to provide a columnar dryer for noodles and the like which has no movable parts within the dryer portion itself, and in which the material-contacting surfaces are substantially free of obstructions. A further object of the present invention resides in the provision of a structure that is easily and simply manufactured, maintained and operated, and that is not subject to certain of the disadvantages of the prior art structures. These and other and further objects will be in part apparent and in part pointed out as the specification proceeds.

In the drawings:

Figure 2 is a side elevation of the device of Figure 1 with certain of the access doors omitted for the sake of clarity;

Figure 3 is a top plan view of the device of Figure 1;

Figure 4 is a sectional view taken on line 4—4 of Figure 2, showing the direction of flow of the drying atmosphere;

Figure 5 is an enlarged fragmentary end view of the rotary valve discharge assembly;

Figure 6 is a partially broken away perspective view of a portion of a screen panel of the noodle columns;

Figure 7 is a partially broken away perspective view of the blower assembly showing the direction of drying atmosphere flow therethrough;

Figure 8 is a perspective view of another embodiment of the present invention showing a single column structure;

Figure 9 is an end elevation view of the dryer portion of Figure 8.

Figure 1:
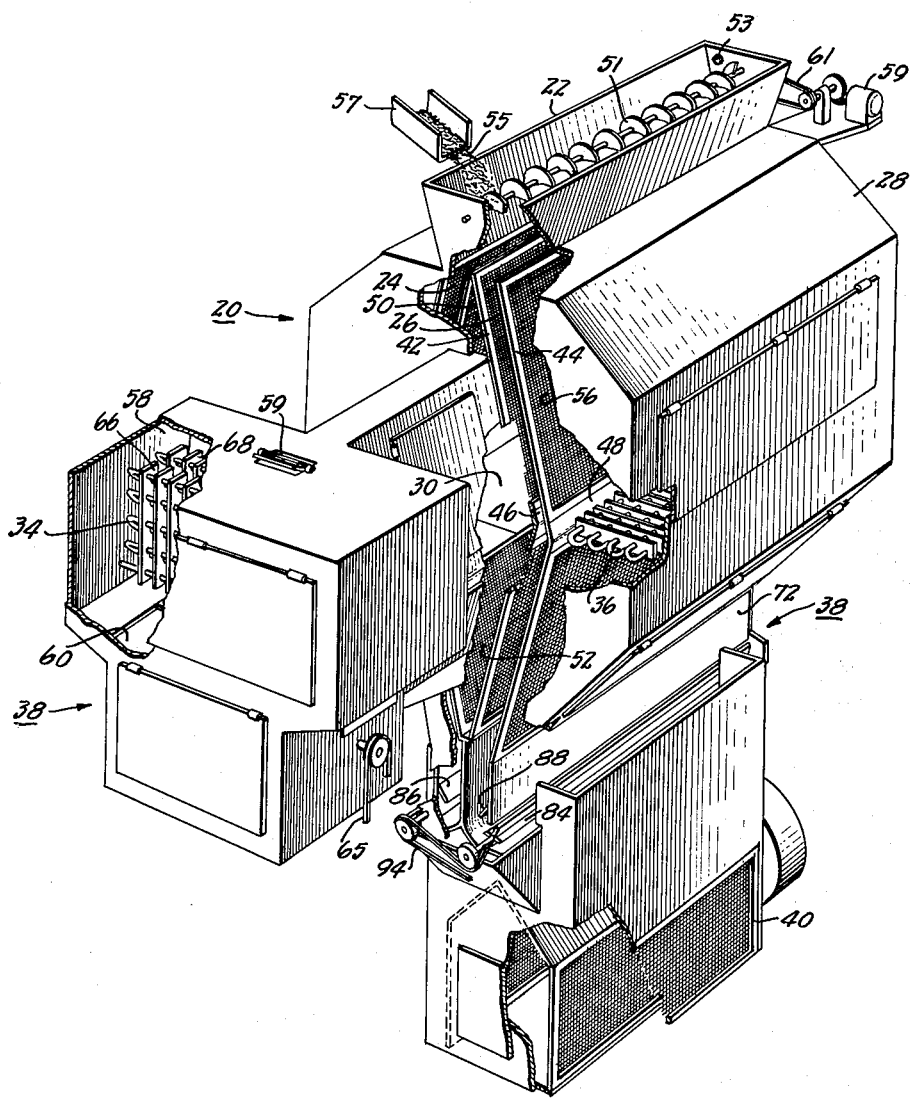
Figure 1 is a perspective view partially broken away, of the double columnar dryer according to the present invention.

While the following illustrative embodiments of the present invention will be described as applied to the drying of noodles, it is to be understood that the principles and apparatus may be used equally well to dry other free flowing solid particulate material such as beans, rice, cocoa beans, corn kernels and the like.

Referring particularly to Figure 1 of the drawings, the dryer assembly 20 comprises a supply header 22, a pair of noodle columns 24 and 26 extending downwardly therefrom, an outer cover member 28 forming a chamber or plenum, enclosing said columns 24 and 26, a central dividing plate 30 dividing said chamber into approximate upper and lower portions, a blower assembly 33 for circulating air through said lower and upper portions, main heating coils 34 and auxiliary heating coils 36 for heating the circulated air to dry the noodles in the columns 24 and 26, and a discharge chute assembly 38 at the bottom of the columns 24 and 26 to control the discharge of noodles therefrom. A cooler 40 is shown positioned below the discharge assembly 38 of the dryer 20 which may be of any desired design to cool the noodles from the hot dried temperature down to a temperature at which they may be conveniently handled and packed.

Each of the columns 24 and 26 is adapted to receive and convey the noodles from the supply header 22 to the discharge assembly 38, and comprises (see Figure 6) any suitable foraminous panels of, for instance, stainless steel 20 x 20 mesh screen surface 39, backed by a ¾ inch center-to-center mesh 41 of .120 inch wire or any other suitable backing screen (if needed) to give the screen mesh the required strength and to prevent buckling. Each column has an inner and outer wall 42 and 44 respectively of these panels which are joined at the middle by solid plates 46 and 48 which serve, in addition to joining the panels together, to provide an isolating effect between the upper and lower portions as will be described in detail hereinafter.

As may be clearly seen in Figures 1 and 4, the columns 24 and 26 diverge outwardly from the supply header 22 to approximately the midpoints of plates 46 and 48 and then converge toward the discharge hopper assembly 38. This provides an inner chamber or plenum between the columns 24 and 26 which is divided into portions 50 and 52 by the central plate 30 mounted between the inner plates 46 of the columns 24 and 26. The columns 24 and 26 are centrally positioned within the outer cover 28 which forms plenums 54 and 56 outwardly of each of the columns 24 and 26. Positioned within these outer chambers 54 and 56 adjacent plates 46 and 48 are the auxiliary heating coils 36 which may be of any convenient type and which are shown as a series of tubes having flat fins thereon which give a high rate of heat transfer and yet are readily cleaned so that the whole system may be maintained in a sanitary condition.

In operation the heated drying atmosphere from the blower assembly 33 is forced into the lower inner chamber 52 out through the lower portions of each column 24 and 26 as shown by the arrows in Figure 4, into the outer lower portions of the plenums 54 and 56. From here the air passes over the auxiliary heating coils 36 where it is heated further to compensate for the heat lost and the humidity picked up in the first pass, into the upper outer chambers 54 and 56, from which it is forced back through the upper portions of the columns 24 and 26 into the upper chamber 50 from which the major portion is returned back to the circulating blower assembly 33. A controlled portion of this atmosphere is discharged through exhaust conduit 57 and replaced by fresh air drawn in through damper 59. The intake damper 59 and exhaust damper 61 are adjusted to maintain the desired relative humidity in the drying atmosphere.

Referring to Figures 2 and 7, the blower assembly 33 comprises generally upper and lower chambers 58 and 60 connected to the corresponding inner upper and lower chambers 50 and 52 between the columns 24 and 26. The blower 62 for moving the drying atmosphere through the columns of noodles is located in the lower chamber 60 of the blower assembly and is illustratively of the double inlet centrifugal type. Blower 62 is driven by any suitable motor 64 positioned below the blower by, for instance, a belt 65. Mounted above the blower in the upper chamber 58 are heating coil banks 66 and 68 which are adapted to heat initially the air to be circulated to the required temperature. This air comprises the return air from chamber 50 and fresh air drawn in through inlet 59 as shown by the arrows in Figure 7. The heated air after passing over coil banks 66 and 68, passes down into chamber 60, into blower 62 through the open ends thereof and back to chamber 52 for the next cycle.

There is thus provided a substantially closed drying atmosphere system in which the major portion of the air is recirculated so that higher temperatures may be utilized and the air may be circulated more economically.

Referring now to Figures 1 and 5, the discharge assembly mechanism 38 comprises a pair of imperforate outer plates 70 and 72 connected to the bottom edges of the outer walls 44 of the columns 24 and 26 and a similar central dividing plate 74 connected to the adjoining edges of the inner walls 42 of the columns 24 and 26. These partitions extend downwardly for a substantial distance from the edge of the wall portions to the rotary discharge valve assembly 76. The center plate 74 has diverging curved bottom portions 78 and 80 which extend outwardly and laterally therefrom to a position underneath the corresponding rotary valves 82 and 84 and the outer plates have inwardly diverging flanges 86 and 88 adjacent their bottom edges. There is thus provided a substantially solid column or "head" 90 and 92 of noodles or the like in the bottom of each column 24 and 26 which act as an air seal to prevent the escape of the circulated air out through the discharge assembly. The flanges 86 and 88 serve to keep the direct weight of the column of noodles or the like off the rotary valves 82 and 84 to facilitate their ease of operation and prevent damage to the noodles.

As may be seen in Figure 2, the valves are driven by suitable belt drive means 94 to move the noodles from the bottom of the discharge assembly 38 into the top of the cooler mechanism 40 or other suitable receiving means. The rotary valves 82 and 84 thus act not as air seals, but merely to remove the noodles from the bottom of the columns 24 and 26, and thus may have a relatively large clearance which further facilitates the ease of operation thereof and prevents damage to the noodles or other material being dried.

Similarly, the supply hopper 22 is maintained in a filled condition so that there is a "head" of noodles over the top of the columns 24 and 26 which will act as an air seal in a manner similar to the "heads" in the bottoms of the columns of the discharge mechanism 38. This filling is accomplished by the feed screw 51 and control 53 which cooperate to feed the noodles 55 after they are discharged from input spout 57 (which may be supplied in any appropriate manner) along the header. Screw 51 is driven by motor 59 through belt 61 until the noodles are distributed along the header and exert a pressure on control 53 mounted in the far end wall of header 22. Control 53 is arranged to shut off motor 59 when the level of noodles exceeds a given value and to turn it on again when they fall below said value.

Similarly the plates 46 and 48 in each column 24 and 26 act together with the grain therebetween at any given instant as an air seal to prevent the circulated air from by-passing the auxiliary coils by flowing between the walls of the columns 24 and 26 rather than out into the lower outer chambers 54 and 56 through the auxiliary coils 36 into the upper portions of the chambers 54 and 56 and back through the upper portions of the columns, as described above.

There is thus provided a dryer of greatly improved sanitary characteristics having no moving parts in contact with the noodles and having a substantially closed circulating path for the dry air with appropriate heating and humidity control therefor, so that noodles passed through may be uniformly dried to the desired degree of moisture content at a minimum of cost and time and in a minimum of space.

Referring now to Figures 8 and 9, there is shown a further embodiment of the present invention, wherein a single sheet-like chamber or column 100 is provided for guiding the noodles from a supply header 102 to a discharge hopper assembly 104.

The walls of column 100 are formed of screen panels such as those of Figure 6 and are enclosed within an outer cover 106 which forms a series of plenum chambers about column 100. As with columns 24 and 26, column 100 has a pair of imperforate side wall plates 108 and 110 at the midpoint thereof, and has extending therefrom solid plates 112 and 114 which divide the plenum chambers into upper and lower portions 116 and 118 respectively on both sides of the column 100.

Positioned approximately at the midpoint of each chamber outwardly of the plates 112 and 114, are the drying atmosphere heater and blower assemblies. These may illustratively be standard air conditioning type of units containing a series of three blowers 120 mounted on a common shaft journaled in the outer cover 106, or having outboard bearings, and driven by any suitable motor and belt means 122. The heating coils may be any desired number of banks to give the requisite heating, and are illustratively shown as two banks 124 and 126. At least one side of the plenum chambers is provided with intake and exhaust means, illustratively shown in Figure 9 on the right hand side. Exhaust pipe 128 has therein a control damper 130 and similarly intake 132 has a control damper 134 so that the relative humidity of the drying atmosphere may be readily controlled. Baffles 136 and 138 are provided to direct the movement of the air to obtain the desired flow characteristics.

The supply header 102 is similar to that of Figure 1, except that the noodles may be supplied from a discharge spout 140 to the central portion of the feed screw 142 which feeds and distributes the noodles from the center toward each end until stopped by a control 144 similar to control 53 of Figure 1 to provide a "head" air seal as before.

The discharge assembly comprises a rotary valve 146 similar to that of Figures 4 and 5 which acts with the solid lower portions 148 and 150 of column 100 to form a "head" or air seal to prevent leakage of the drying atmosphere out the discharge spout. The dried noodles are removed from the column 100 by the valve 146 and allowed to slide down chute 150 into cooler 152 which may be of any desired type to cool the noodles from the hot dried condition to a temperature suitable for safe storage or handling and packaging.

In operation, as the noodles are flowing through the column 100, air is drawn in the intake 132, combined with the air to be recirculated, passed over the heating coils 124 and 126 in the right hand side of Figure 9, picked up by the blowers 120 and forced into the right hand lower chamber 118, through the lower portion of the column 100 into the left hand lower chamber 116, between the baffles 136' and 138', passed over the left hand heating coils 124' and 126', picked up and reaccelerated by blowers 120', discharged into the left hand chamber 116 and forced through the upper portion of column 100 into right hand chamber 118. A portion of the drying atmosphere is then discharged through the exhaust 128 and the remainder passed between baffles 136 and 138 to be recirculated as above.

Thus by controlling the amount of air discharged and replaced and by varying the temperature of the circulated atmosphere, the desired rate of drying may be maintained within very close limits, as with the embodiment of Figures 1 through 7.

While there are given above certain specific examples of this invention and its application in practical use, and also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt and apply it in numerous forms, each as may be best suited to the requirement of a particular use.

We claim:

1. A columnar after-dryer for noodles and the like comprising first and second substantially vertically disposed columns adapted to guide therethrough freely flowing streams of noodles and the like, said columns being joined together at the tops and bottoms thereof and diverging from their opposite ends to about their midpoints a dividing plate extending between about the midpoints of said columns to form upper and lower chambers therebetween, a housing enclosing said columns and forming therewith a plenum chamber disposed outwardly of each of said columns, air circulating means operatively connected to the chambers between said columns to circulate air from one of said chambers through one portion of each of said columns into said plenum chambers, through said chambers to another portion of the columns and through said other portions to the other chamber between said columns and back to the circulating means, and heating means in said plenum chambers approximately in alignment with said dividing plate for heating the air during its flow through the plenum chambers from said one portion of said columns to the other portions thereof.

2. A device for drying solid granular material comprising two perforated inner walls joined at their tops and bottoms and diverging outwardly therefrom to about their midportions and outer walls substantially parallel with said inner walls to form between said inner and outer walls a pair of generally sheet-like columns for confining granular material flowing therethrough by gravity, said columns having a common inlet and converging discharge outlets, an imperforate partition extending between adjacent inner walls and forming separate upper and lower chambers between said columns, a housing enclosing and spaced from said outer walls and forming compartments outside said outer walls, means for introducing a drying medium into one of said upper and lower chambers, means for withdrawing said drying medium from the other of said upper and lower chambers, said drying means flowing from said one chamber transversely through adjacent portions of said walls into the compartments outside said outer walls, and from the last-mentioned compartments through another portion of said walls into said other chamber and heating units in said compartments outside said outer walls substantially in alignment with said partition to heat the drying medium before it flows through said another portion of said walls.

3. The device set forth in claim 2 comprising doors in said housing for access to said heating units and said outer walls.

4. A device as described in claim 2 wherein the inner and outer walls have solid plate portions at the ends of said partition and adjacent to said heating units to form by-pass seals for the circulating atmosphere between said first and second portions of said sheet-like chambers.

5. A device for drying granular material as set forth in claim 2 comprising a supply header disposed at the inlet ends of said columns and a discharge assembly mechanism disposed at the discharge outlet, said supply header and discharge assembly including solid plate portions positioned to form, with the product to be dried, sealing heads at the input and output to said columns whereby said device is sealed against escape of said drying atmosphere.

6. A device as described in claim 5 wherein said header comprises a generally V-shaped trough having therein a feed screw to uniformly distribute the material to be dried along said header and wherein said discharge assembly comprises at least one rotary valve and control means therefor to discharge predetermined quantities of material from said sheet-like columns.

7. A device as described in claim 5 wherein said discharge assembly comprises a pair of imperforate walled chutes extending across the bottom of said sheet-like chambers, a multivaned rotary valve positioned in the bottom of each of said chutes, driving means for rotating said valves to discharge the product therefrom, and inwardly projecting flanges mounted on the outer walls of said chutes to prevent the full weight of the product in the chambers from directly resting on said rotary valves whereby they may be readily actuated.

References Cited in the file of this patent

UNITED STATES PATENTS

| | | |
|---|---|---|
| 990,433 | Geiger | Apr. 25, 1911 |
| 1,482,812 | Roberts | Feb. 5, 1924 |
| 1,715,830 | Glinka | June 4, 1929 |
| 1,892,319 | Roth | Dec. 27, 1932 |
| 2,078,515 | Sutherland | Apr. 27, 1937 |
| 2,371,095 | Woodward | Mar. 6, 1945 |
| 2,469,424 | Wood et al. | May 10, 1949 |
| 2,552,093 | Gollbach et al. | May 8, 1951 |
| 2,636,575 | Watson | Apr. 28, 1953 |

FOREIGN PATENTS

| | | |
|---|---|---|
| 426,729 | Germany | Mar. 16, 1926 |
| 849,830 | Germany | Sept. 18, 1952 |